(12) United States Patent
McDougall et al.

(10) Patent No.: US 9,234,153 B2
(45) Date of Patent: Jan. 12, 2016

(54) VISCOSITY IMPROVER GRAFTED WITH UNSATURATED ACYLATING AGENT AND A POLYAROMATIC HYDROCARBON

(71) Applicants: Patrick J. McDougall, Fairfax, CA (US); Pritesh A. Patel, Novato, CA (US)

(72) Inventors: Patrick J. McDougall, Fairfax, CA (US); Pritesh A. Patel, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 239 days.

(21) Appl. No.: 13/837,868

(22) Filed: Mar. 15, 2013

(65) Prior Publication Data

US 2014/0274842 A1 Sep. 18, 2014

(51) Int. Cl.
| | |
|---|---|
| *C10M 145/04* | (2006.01) |
| *C08F 8/46* | (2006.01) |
| *C08K 5/1539* | (2006.01) |
| *C08F 8/10* | (2006.01) |
| *C08K 5/01* | (2006.01) |
| *C08K 5/05* | (2006.01) |
| *C10M 145/10* | (2006.01) |

(52) U.S. Cl.
CPC ............... *C10M 145/04* (2013.01); *C08F 8/10* (2013.01); *C08F 8/46* (2013.01); *C08K 5/01* (2013.01); *C08K 5/05* (2013.01); *C08K 5/1539* (2013.01); *C10M 145/10* (2013.01)

(58) Field of Classification Search
CPC ............. C10M 145/02; C10M 145/04; C10M 145/10; C10M 2207/025; C08F 8/10; C08F 8/46; C08F 255/02; C08F 255/08; C08F 255/10; C08F 279/02; C08K 5/01; C08K 5/05; C08K 5/1539
USPC ............... 508/233, 235, 239, 241; 525/331.9, 525/332.9, 333.7
See application file for complete search history.

(56) References Cited

U.S. PATENT DOCUMENTS

| | | |
|---|---|---|
| 3,316,177 A | 4/1967 | Dorer |
| 4,160,739 A | 7/1979 | Stambaugh et al. |
| 4,735,736 A | 4/1988 | Chung |
| 4,863,623 A | 9/1989 | Nalesnik |
| 5,429,757 A | 7/1995 | Mishra et al. |
| 5,441,653 A * | 8/1995 | Cleveland et al. ............ 508/270 |
| 5,563,118 A | 10/1996 | Mishra et al. |
| 5,942,471 A | 8/1999 | Kapuscinski et al. |
| 7,790,661 B2 | 9/2010 | Covitch et al. |

* cited by examiner

*Primary Examiner* — Roberto Rabago
(74) *Attorney, Agent, or Firm* — Terrence M. Flaherty

(57) ABSTRACT

Disclosed is an oil-soluble lubricating oil additive composition, suitable for use as a dispersant viscosity index improver in lubricating oils; prepared by the process which comprises reacting a hydrocarbon polymer having a number average molecular weight ($M_n$) between about 7,000 and about 500,000 wherein the polymer backbone has been functionalized with an ethylenically unsaturated acylating agent and a hydroxyl-linked polycyclic fused ring component.

24 Claims, No Drawings

VISCOSITY IMPROVER GRAFTED WITH UNSATURATED ACYLATING AGENT AND A POLYAROMATIC HYDROCARBON

FIELD OF INVENTION

This is directed to performance improving additives for lubricating oils. In particular, the invention relates to polymeric additives useful for improving viscosity, dispersancy, and wear characteristics when employed in lubricating oils compositions.

BACKGROUND

Hydrocarbon polymers, particularly ethylene-alpha olefin copolymers, are in widespread use as viscosity index (V.I.) improving additives for oil compositions, particularly lubricating oil compositions. A substantial body of prior art exists directed towards further reacting these ethylene-alpha olefin copolymer V.I. improvers to form a multi-functional V.I. improver. This multi-functional V.I. Improver additive is used to improve not only the V.I. properties of the oil but often to also impart dispersancy so as to suspend soot or sludge that may form during the operation or use of the lubricant in engines. Other multi-functional V.I. improvers have also been reported to impart antiwear and antioxidant properties, both of which are very useful for sustained engine operation.

The most common method to preparing dispersant V.I. improvers involves first grafting ethylene-alpha olefin copolymers with an ethylenically unsaturated component, typically maleic anhydride, followed by reaction of the grafted polymer with a polyamine. The polyamine used to impart the multifunctional characteristics can be highly variable in nature and includes the use of polyamines that are both aliphatic and aromatic in nature.

Many patents disclose the use of alkylene polyamines with grafted copolymers. U.S. Pat. No. 3,316,177, issued Apr. 25, 1967 to Dorer, teaches the use of alkylene polyamines with ethylene-propylene copolymers grafted with maleic anhydride. This composition is taught to be a useful additive for fuels, lubricants and petroleum fractions to inhibit the formation of harmful deposits.

U.S. Pat. No. 4,160,739, issued Jul. 10, 1979, to Stambaugh et al. discloses graft copolymers wherein the backbone polymer is a polymeric hydrocarbon such as substantially linear ethylene-propylene copolymer and the grafted units are the residues of a monomer system comprising maleic acid or anhydride and one or more other monomers copolymerizable therewith. The graft copolymer system is post-reacted with a polyamine compound comprising a primary or secondary amine. The graft copolymers are stated to impart combined, detergent, viscosity index improvement and other useful properties to lubricating oils and hydrocarbon motor fuels.

U.S. Pat. No. 4,735,736, issued Apr. 5, 1988, to Chung discloses oil-soluble ethylene-alpha olefin hydrocarbon polymers, useful as V.I. improvers, preferably ethylene-propylene copolymer, grafted with an unsaturated acid material, such as maleic anhydride, followed by reaction with a polyamine, preferably a tertiary-primary amine, and treatment and/or reaction with aliphatic monoamine. The resulting material is used in oil compositions, such as lubricating oil, as a viscosity index improver having sludge dispersancy properties. The monoamine treatment is stated to inhibit viscosity growth of the additive upon storage.

Polyamines containing aromatic functionality are also well described in the patent literature. U.S. Pat. No. 4,863,623, issued Sep. 5, 1989, to Nalesnik discloses an additive composition comprising a graft and an amine-derivatized copolymer prepared from ethylene and at least one $C_3$ to $C_{10}$ alpha-monoolefin which has been reacted with at least one olefinic carboxylic acid acylating agent to form one or more acylating reaction intermediates characterized by having a carboxylic acid acylating group within their structure and reacting the reaction intermediate with an amino-aromatic polyamine to form the graft and amine-derivatized copolymer. A lubricating oil composition containing the amine-derivatized copolymer is also disclosed.

U.S. Pat. No. 5,429,757, issued Jul. 4, 1995, and U.S. Pat. No. 5,563,118, issued Oct. 8, 1996, to Mishra et al. disclose an additive composition comprising a graft and derivatized copolymer prepared from an ethylene-alpha-olefin copolymer which has been reacted with at least one olefinic carboxylic acid acylating agent to form one or more acylating reaction intermediates and reacting the reaction intermediate with an amino-aromatic compound. A lubricating oil composition containing the same is also provided.

U.S. Pat. No. 5,942,471, issued Aug. 24, 1999 to Kapuscinski et al., discloses the preparation of dispersant olefin copolymers that also have antioxidant properties. This example uses specific aromatic polyamines such as phenothiazines and N-phenyl-p-phenylenediamine that are reacted in combination with ethylene-propylene copolymers that have been grafted with an ethylenically unsaturated group. The additive composition is said to impart V.I. improver, dispersancy, antiwear, and antioxidant properties when used in a lubricating oil.

The use of monoamines with copolymers grafted with ethylenically unsaturated groups is also described, though to a lesser extent than polyamine functionality. U.S. Pat. No. 7,790,661 B2, issued Sep. 7, 2010 to Covitch et al., teaches the use of several aromatic monoamines to prepare functionalized polymers with improved soot handling performance when used in a lubricating oil.

SUMMARY

The present invention is directed in part to a polymeric additive which may be added to lubricating oils and contributes to improvements in the viscosity characteristics, the dispersancy and amelioration of soot thickening, and to improving wear characteristics when employed for example in lubricating oil formulations for mechanical equipment.

Accordingly, disclosed is an oil-soluble lubricating oil additive composition prepared by the process which comprises reacting: (a) a hydrocarbon polymer having a number average molecular weight ($M_n$) between about 7,000 and about 500,000: with (b) an ethylenically unsaturated acylating agent; and with (c) a hydroxyl-linked polycyclic hydrocarbon compound having 3 to 6 contiguous fused carbocyclic rings wherein the carbocyclic ring is independently selected from 5 to 7 carbon atoms and the polycyclic hydrocarbon compound contains at least $5\pi$ bonds. Included are mixtures of polymer backbones, mixtures of acylating agents and/or mixtures of hydroxyl-linked polycyclic hydrocarbon compounds. In this regard the oil-soluble lubricating oil additive may have one or more different hydroxyl-linked polycyclic hydrocarbons pendent to the backbone or in an optional regard the acylating agent is further reacted with a second selected alcohol from the group consisting of aliphatic alcohols, cylcoaliphatic alcohols and monohydroxy polyethers. In one aspect, the polymer is first reacted (i.e. functionalized or grafted) with an ethylenically unsaturated acylated agent to form a grafted polymer intermediate which is reacted with the hydroxyl-linked polycyclic hydrocarbon compound. In another aspect, the ethylenically unsaturated acylated agent is first reacted with the hydroxyl-linked polycyclic hydrocarbon compound to form a reaction product wherein the reaction product is thereafter grafted to the polymer backbone. In this regard, the oil-soluble lubricating oil additive composition is a grafted oil-soluble lubricating oil additive composition. These reactions may be conducted in extruder. In one aspect, the hydrocarbon polymer is a homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers. In this regard, the copolymer selected from (1) polymers of aliphatic olefins having from 2 to about 28 carbon atoms wherein one olefin is ethylene; more particularly, wherein the copolymer is an ethylene-propylene copolymer or ethylene-propylene-diene copolymer having a number average molecular weight from 7,000 to about 60,000.

Thus, a suitable hydrocarbon polymer is an optionally hydrogenated polymer of dienes, wherein the diene is a conjugated diene selected from the group consisting of isoprene, butadiene, and piperylene. Similarly, the hydrocarbon polymer is a hydrogenated copolymer of a conjugated diene with vinyl substituted aromatic compound wherein the vinyl substituted aromatic compound is a styrenic monomer, more particularly where the diene is selected from the group consisting of isoprene and 1,3-butadiene. A further aspect is wherein the hydrocarbon polymer is a star polymer wherein the arms are derived from dienes and vinyl substituted aromatic compounds.

In one regard, the ethylenically unsaturated acylating agent has a carboxylic acid or functional derivative thereof, comprises at least one member of the group consisting of acrylic acid, crotonic acid, methyacrylic acid, maleic acid, maleic anhydride, fumaric acid, itaconic acid and itaconic anhydride, citraconic acid, citraconic anhydride, mesaconic acid, glutaconic acid, chloromaleic acid, aconitic acid, methylcrotonic acid, sorbic acid, and ester of the acids, and combinations of the foregoing. The ethylenically unsaturated carboxylic acid or function derivative is typically grafted onto the hydrocarbon polymer backbone via the ene reaction at reaction temperature or the grafting of the hydrocarbon copolymer is conducted at about 100° C. to about 250° C. in the presence of a free radical initiator. In this regard, the hydrocarbon polymer backbone has been suitably functionalized with a maleic anhydride acylating agent in the range of 0.5 to 10.0 wt % of maleic anhydride based upon the total mass of polymer, more preferably in the range of 0.5 to 3.0 wt % of maleic anhydride based upon the total mass of polymer.

In one regard, the hydroxyl-linked polycyclic hydrocarbon compound has the linker group selected from the group consisting of a hydroxy-alkylene group from 1 to 10 carbon atoms, hydroxyl-alky-oxy-, hydroxyl-alk-(oxy-alk)$_n$-oxy and hydroxyl-alk-(oxy-alk)$_n$-thio- wherein alk in each instance is independently alkylene selected from 2 to 6 carbon atoms and n is an integer from 1 to 100. In this respect, the hydroxyl-linked polycyclic hydrocarbon compound has the linker group selected from the group consisting of a hydroxy-alkylene group from 1 to 10 carbon atoms. In another respect, the hydroxyl-linked polycyclic hydrocarbon compound has the linker group selected from the group consisting of a hydroxyl-alky-oxy wherein alk is alkylene selected from 2 to 6 carbon atoms. In yet another respect, the hydroxyl-linked polycyclic hydrocarbon compound has the linker group selected from the group consisting of a hydroxyl-alk-(oxy-alk)$_n$-oxy and hydroxyl-alk-(oxy-alk)$_n$-thio- wherein alk in each instance is independently alkylene selected from 2 to 6 carbon atoms and n is an integer from 1 to 100. Mixtures of various hydroxyl-linked polycyclic hydrocarbon compounds may be used and optionally with a secondary alcohol. Typically the secondary alcohol would be employed at equal or lesser mole ratio in comparison to the hydroxyl-linked polycyclic hydrocarbon. In one aspect the reaction of steps a), b) and c) are first conducted and thereafter d) the resulting reacted compound is further reacted with one or more secondary alcohol selected from a reactive alcohol from the group consisting of aliphatic alcohols, cycloaliphatic alcohols and monohydroxy polyethers.

One embodiment is directed to an additive concentrate comprising an inert liquid organic diluent and from about 3 to about 95 weight percent based upon to total weight of the additive of the oil-soluble lubricating oil additive composition prepared by the process which comprises reacting: (a) a hydrocarbon polymer having a number average molecular weight ($M_n$) between about 7,000 and about 500,000 wherein the polymer backbone has been functionalized with an ethylenically unsaturated acylating agent; and (b) a hydroxyl-linked polycyclic hydrocarbon compound having 3 to 6 contiguous fused carbocyclic rings wherein the carbocyclic ring is independently selected from 5 to 7 carbon atoms and the polycyclic hydrogen compound contains at least 5π bonds.

Suitable organic diluent are known in the art with a particularly suitable diluent being a diluent oil more preferably selected from a Group I, Group II, Group III or Group IV base oil or a mixture thereof, or a mixture of a Group I base oil and at least one Group II, Group II or Group IV base oil.

A further aspect is directed to a lubricating oil composition comprising a major amount of an oil of lubricating viscosity and a minor amount of the oil soluble lubricating oil additive of additive concentrate cited in the paragraph above or the substantially neat oil-soluble lubricating oil additive composition as recited above. When directed to a finished lubricating oil it may further comprising at least one additive selected from the group consisting of antioxidants, antiwear agents, detergents, dispersants, friction modifiers, corrosion and rust inhibitors, viscosity index improvers and anti-foam agents. Thus, compositions may be custom tailor based upon the application.

DETAILED DESCRIPTION

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than, carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "an amine" includes mixtures of amines of the same type. As another example the singular form "amine" is intended to include both singular and plural unless the context clearly indicates otherwise.

Hydrocarbon Polymer as used herein, the expression "polymer" refers to polymers of all types, i.e., homopolymers and copolymers. The term homopolymer refers to polymers derived from essentially one monomeric species; copolymers are defined herein as being derived from 2 or more monomeric species.

The hydrocarbon polymer is an essentially hydrocarbon based polymer, usually one having a number average molecular weight ($M_n$) between about 7,000 and about 500,000, often from about 20,000 to about 200,000, frequently from about 30,000 to about 100,000. Molecular weights of the hydrocarbon polymer are determined using well known methods described in the literature. Examples of procedures for determining the molecular weights are gel permeation chromatography (GPC) (also known as size-exclusion chromatography) and vapor phase osmometry (VPO). It is understood that these are average molecular weights. GPC molecular weights are typically accurate within about 5-10%. Even with narrow polydispersity, a polymer with $M_n$ of about 20,000 may have some species as low as about 15,000. A polymer with $M_n$ about 35,000 and $M_n$ about 20,000 may have GPC peaks corresponding to polymer components as low as about 10,000 and as high as 75,000.

These and other procedures are described in numerous publications including: P. J. Flory, "Principles of Polymer Chemistry", Cornell University Press (1953), Chapter VII, pp. 266-316, "Macromolecules, an Introduction to Polymer Science", F. A. Bovey and F. H. Winslow, Editors, Academic Press (1979), pp. 296-312, and W. W. Yau, J. J. Kirkland and D. D. Bly, "Modem Size Exclusion Liquid Chromatography", John Wiley and Sons, New York, 1979.

Unless otherwise indicated, GPC molecular weights referred to herein are polystyrene equivalent weights, i.e., are molecular weights determined employing polystyrene standards.

A measurement which is complementary to a polymer's molecular weight is the melt index (ASTM D-1238). Polymers of high melt index generally have low molecular weight, and vice versa. The polymers of the present invention preferably have a melt index of up to 200 dg/min., more preferably 5 to 20 dg/min when measured using ASTM D1238 condition L at 230° C. and 2.16 kg load.

When the molecular weight of a polymer is greater than desired, it may be reduced by techniques known in the art. Such techniques include mechanical shearing of the polymer employing masticators, ball mills, roll mills, extruders and the like. Oxidative or thermal shearing or degrading techniques are also useful and are known. Details of numerous procedures for shearing polymers are given in U.S. Pat. No. 5,348,673. Reducing molecular weight also tends to improve the subsequent shear stability of the polymer.

In preferred embodiments, the hydrocarbon polymer is at least one oil soluble or dispersible homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers.

These preferred polymers are described in greater detail herein below.

(1) Polymers of Aliphatic Olefins

The hydrocarbon polymer may be one which in its main chain is composed essentially of aliphatic olefin, especially alpha olefin, monomers. The polyolefins of this embodiment thus exclude polymers which have a large component of other types of monomers copolymerized in the main polymer, such as ester monomers, acid monomers, and the like. The polyolefin may contain impurity amounts of such materials, e.g., less than 5% by weight, more often less than 1% by weight, preferably, less than 0.1% by weight of other monomers. Useful polymers include oil soluble or dispersible copolymers of ethylene and $C_3$ to $C_{28}$ alpha-olefins.

The olefin copolymer preferably has a number average molecular weight ($M_n$) determined by gel-permeation chromatography employing polystyrene standards, ranging from about 7,000 to about 500,000, often from about 20,000 to about 300,000, often to about 200,000, more often from about 30,000 to about 100,000, even more often from about 30,000 to about 50,000. Exemplary polydispersity values ($M_w/M_n$) range from about 1.5 to about 10, often to about 3.0, preferably, from about 1.7, often from about 2.0, to about 2.5.

These polymers may be homopolymers or copolymers and are preferably polymers of alpha-olefins having from 2 to about 28 carbon atoms. Preferably they are copolymers, more preferably copolymers of ethylene and at least one other alpha-olefin having from 3 to about 28 carbon atoms, i.e., one of the formula $CH_2=CHR_a$ wherein $R_a$ is straight chain or branched chain alkyl radical comprising 1 to 26 carbon atoms. Preferably $R_a$ is alkyl of from 1 to 8 carbon atoms, and more preferably is alkyl of from 1 to 2 carbon atoms. Examples include homopolymers from monoolefins such as propylene, 1-butene, isobutene, 1-pentene, 1-hexene, 4-methyl-1-pentene, 1-heptene, 1-octene, 1-nonene, 1-decene, etc and copolymers, preferably of ethylene with one or more of these monomers. Preferably, the polymer of olefins is an ethylene-propylene copolymer another preferred olefin copolymer is an ethylene-1-butene copolymer.

The ethylene content of the copolymer is preferably in the range of 10 to 80 percent by weight, and more preferably 40 to 75 percent by weight. When propylene and/or 1-butene are employed as comonomer(s) with ethylene, the ethylene content of such copolymers most preferably is 45 to 65 percent, more preferably in the range of 45 to 52 percent by weight although higher or lower ethylene contents may be present. Most preferably, these polymers are substantially free of ethylene homopolymer, although they may exhibit a degree of crystallinity due to the presence of small crystalline polyethylene segments within their microstructure. The polymer can be a blend of two or more homopolymers of different ethylene content in the range of 10 to 80 percent by weight. Such polymer blends can be made by mixing two or more polymers in a mixing device such as extruder; or by making the each polymer(s) in series or parallel reactors, where each reactor makes a homopolymer or copolymer.

In one particular embodiment, the polymer is a homopolymer derived from a butene, particularly, isobutylene. Especially preferred is where the polymer comprises terminal vinylidene olefinic double bonds.

Copolymers herein can include without limitation blends or reacted products of ethylene and one or more $C_3$ to $C_{28}$ alpha-olefins, and additionally optionally other dienes or polyenes and thus may herein also include terpolymers, and other higher forms. Other alpha-olefins suitable in place of propylene to form the copolymer or to be used in combination with ethylene and propylene to form a terpolymer include 1-butene, 1-pentene, 1-hexene, 1-octene and styrene; alpha-omega-diolefins such as 1,5-hexadiene, 1,6-heptadiene, 1,7-octadiene; branched chain alpha-olefins such as 4-methyl-butene-1,5-methylpentene-1 and 6-methylheptene-1; vinyl substituted aromatic compounds such as styrene; and mixtures thereof. Methods for making the polymer substrate are also described, e.g., in U.S. Pat. Nos. 4,863,623, 5,075,383, and 6,107,257, which descriptions are incorporated herein by reference.

More complex polymer substrates, often designated as interpolymers, also may be used as the olefin polymer starting material, which may be prepared using a third component. The third component generally used to prepare an interpolymer substrate is a polyene monomer selected from nonconjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norbornene, 1,5-heptadiene, and 1,6-octadiene. A mixture of more than one diene can be used in the preparation of the interpolymer. A preferred nonconjugated diene for preparing a terpolymer or interpolymer substrate is 1,4-hexadiene.

The triene component will have at least two nonconjugated double bonds, and up to about 30 carbon atoms in the chain. Typical trienes useful in preparing the interpolymer of the disclosure are 1-isopropylidene-3α,4,7,7α-tetrahydroindene, 1-isopropylidenedicyclopentadiene, dihydro-isodicyclopentadiene, and 2-(2-methylene-4-methyl-3-pentenyl)[2.2.1]bicyclo-5-heptene.

The polymerization reaction used to form an ethylene olefin copolymer substrate can generally be carried out in the presence of a catalyst system capable of polymerizing ethylene and other higher alpha-olefin and optionally a three or more monomers into the polymer or interpolymers described above. The typical catalyst system used in such polymerizations are Ziegler-Natta or metallocene or other known catalyst systems such as dual catalyst system or chain shuttling catalyst. The Ziegler-Natta catalysts include many mixtures of halides of transition metals, especially titanium, chromium, vanadium, and zirconium, with organic derivatives of non-transition metals, particularly alkyl aluminum compounds. The terms "metallocene" and "metallocene catalyst precursor," as used herein, refer to compounds possessing a transition metal M, with cyclopentadienyl (Cp) ligands, at least one non-cyclopentadienyl-derived ligand X (e.g., a leaving group), and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst, which refers generally to an organometallic complex with a vacant coordination site that can coordinate, insert, and polymerize olefins. The metallocene catalyst precursor is preferably one of, or a mixture of metallocene compounds. Examples of the dual catalyst systems and chain shuttling catalyst can be found in at U.S. Pat. Nos. 7,999,039, 6,875,816 and 6,942,342, which hereby are incorporated as reference.

The polymerization reaction to form the polymer is generally carried out in the presence of a catalyst in a solvent medium. The polymerization solvent may be any suitable inert organic solvent that is liquid under reaction conditions for solution polymerization of monoolefins which is generally conducted in the presence of a Ziegler-Natta or metallocene type catalyst. Examples of satisfactory hydrocarbon solvents include straight chain paraffin's having from about 5 to about 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight-chain paraffinic hydrocarbons and aromatic hydrocarbons described above, are particularly suitable. The solvent selected may be a mixture of one or more of the foregoing hydrocarbons. It is desirable that the solvent be free of substances that will interfere with the polymerization reaction.

The polymerization medium is not specific and can include solution, slurry, emulsion, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffin's having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

The polymers can be random copolymers, block copolymers, and random block copolymers. Ethylene propylene copolymers are usually random or statistical copolymers. Random or statistical copolymers can be a mixture of two or more polymers made in two or more reactors in series. Block copolymers may be obtained by conducting the reaction in a tubular reactor. Such a procedure is described in U.S. Pat. No. 4,804,794 which is hereby incorporated by reference for relevant disclosures in this regard. These polymers are available commercially as PARATONE® 8941 and PARATONE® 8910 (marketed by Chevron Oronite Company L.L.C.). Block copolymers can also be obtained by selecting appropriate catalyst and/or process for the polymerization. Such polymers are described in U.S. Pat. Application No. 20060199896 which is hereby incorporated by reference for relevant disclosures in this regard. Such Olefin block copolymers are sold commercially by Dow Chemical's under trade name INFUSE™ olefin block copolymers.

Copolymers of ethylene with higher alpha olefins are the most common copolymers of aliphatic olefins. Ethylene-propylene copolymers are the most common ethylene-alpha-olefin copolymers and are preferred for use in this invention. A description of an ethylene-propylene copolymer appears in U.S. Pat. No. 4,137,185 which is hereby incorporated herein by reference.

Useful ethylene-alpha olefin, usually ethylene-propylene, copolymers are commercially available. Ethylene-alpha olefin copolymer comprising from about 30 to about 55 weight percent monomer units derived from ethylene are generally referred as low ethylene or amorphous copolymers. Ethylene alpha-olefin copolymer comprising from about 60 to about 80 weight percent units derived from ethylene are generally referred as high ethylene (semi-crystalline) polymers. The polymer substrate can also contain mixtures of amorphous and semi-crystalline polymers in weight ratios as described in U.S. Pat. No. 5,427,702 which hereby is incorporated by reference. The typical polymers available commercially that include amorphous copolymers are PARATONE® 8921 available from Chevron Oronite, LZ7067, LZ7065 and LZ7060 available from the Lubrizol Corporation, Keltan® 1200A, 1200B available from Lanxess and NDR125 available from Dow Chemical Company. The shear stability index (SSI) of the polymer substrate typically range from about 3 to about 60, more typically from about 5 to about 50, more preferably from about 10 to about 25. The thickening efficiency of the useful polymer substrate range from 0.4 to 4.0, more typically from 0.9 to about 3.2.

(2) Polymers of Dienes

The hydrocarbon polymer may be a homopolymer or copolymer of one or more dienes. The dienes may be conjugated such as isoprene, butadiene and piperylene or non-conjugated such as 1-4 hexadiene, ethylidene norbornene, vinyl norbornene, 4-vinyl cyclohexene, and dicyclopentadiene. Polymers of conjugated dienes are preferred. Such polymers are conveniently prepared via free radical and anionic polymerization techniques. Emulsion techniques are commonly employed for free radical polymerization.

As noted hereinabove, useful polymers have $M_n$ ranging from about 7,000 to about 500,000. More often, useful polymers of this type have $M_n$ ranging from about 20,000 to about 100,000.

These polymers may be and often are hydrogenated (optionally hydrogenated) to reduce the amount of olefinic unsaturation present in the polymer. They may or may not be exhaustively hydrogenated. Hydrogenation is often accomplished employing catalytic methods. Catalytic techniques employing hydrogen under high pressure and at elevated temperature are well-known to those skilled in the chemical art. Other methods are also useful and are well known to those skilled in the art.

Extensive discussions of diene polymers appear in the "Encyclopedia of Polymer Science and Engineering", Volume 2, pp. 550-586 and Volume 8, pp. 499-532, Wiley-Interscience (1986), which are hereby: expressly incorporated herein by reference for relevant disclosures in this regard.

The polymers include homopolymers and copolymers of conjugated dienes including polymers of hydrocarbyl substituted 1,3-dienes preferably at least one substituent is hydrogen. Normally, the total carbon content of the diene will not exceed 20 carbons. Preferred dienes for preparation of the polymer are piperylene, isoprene, 2,3-dimethyl-1,3-butadiene, chloroprene and 1,3-butadiene. Suitable homopolymers of conjugated dienes are described, and methods for their preparation are given in numerous U.S. patents. As a specific example, U.S. Pat. No. 3,959,161 teaches the preparation of hydrogenated polybutadiene. In another example, upon hydrogenation, 1,4-polyisoprene becomes an alternating copolymer of ethylene and propylene.

Copolymers of conjugated dienes are prepared from two or more conjugated dienes. Useful dienes are the same as those described in the preparation of homopolymers of conjugated dienes hereinabove. For example, U.S. Pat. No. 4,073,737 describes the preparation and hydrogenation of butadiene-isoprene copolymers.

(3) Copolymers of Conjugated Dienes with Vinyl Substituted Aromatic Compounds:

In one embodiment, the hydrocarbon polymer is a copolymer of a vinyl-substituted aromatic compound and a conjugated diene. The vinyl substituted aromatics generally contain from 8 to about 20 carbons, preferably from 8 to 12 carbon atoms and most preferably, 8 or 9 carbon atoms.

Examples of vinyl substituted aromatics include vinyl anthracenes, vinyl naphthalenes and vinyl benzenes (styrenic compounds). Styrenic compounds are preferred, examples being styrene, alpha-methystyrene, ortho-methyl styrene, meta-methyl styrene, para-methyl styrene, para-tertiary-butylstyrene and chlorostyrene, with styrene being preferred.

The conjugated dienes generally have from 4 to about 10 carbon atoms and preferably from 4 to 6 carbon atoms. Example of conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The vinyl substituted aromatic content of these copolymers is typically in the range of about 15% to about 70% by weight, preferably about 20% to about 40% by weight. The aliphatic conjugated diene content of these copolymers is typically in the range of about 30% to about 85% by weight, preferably about 60% to about 80% by weight.

The polymers, and in particular, styrene-diene copolymers, can be random copolymers or block copolymers, which include regular block copolymers or random block copolymers. Random copolymers are those in which the comonomers are randomly, or nearly randomly, arranged in the polymer chain with no significant blocking of homopolymer of either monomer. Regular block copolymers are those in which a small number of relatively long chains of homopolymer of one type of monomer are alternately joined to a small number of relatively long chains of homopolymer of another type of monomer. Random block copolymers are those in which a larger number of relatively short segments of homopolymer of one type of monomer alternate with relatively short segments of homopolymer of another monomer. Block copolymers, particularly diblock copolymers are preferred. Examples of such polymer substrate is illustrated by U.S. Pat. Nos. 6,162,768; 6,215,033; 6,248,702 and 6,034,184 which is hereby incorporated by reference.

The random, regular block and random block polymers used in this invention may be linear, or they may be partially or highly branched. The relative arrangement of homopolymer segments in a linear regular block or random block polymer is obvious. Differences in structure lie in the number and relative sizes of the homopolymer segments; the arrangement in a linear block polymer of either type is always alternating in homopolymer segments.

Normal or regular block copolymers usually have from 1 to about 5, often 1 to about 3, preferably only from 1 to about 2 relatively large homopolymer blocks of each monomer. The sizes of the blocks are not necessarily the same, but may vary considerably. The only stipulation is that any regular block copolymer comprises relatively few, but relatively large, alternating homopolymer segments.

The copolymers can be prepared by methods well known in the art. Such copolymers usually are prepared by anionic polymerization using Group IA metals in the presence of electron-acceptor aromatics, or preformed organometallics such as sec-butyllithium as polymerization catalysts.

The styrene diene block polymers are usually made by anionic polymerization, using a variety of techniques, and altering reaction conditions to produce the most desirable features in the resulting polymer. In an anionic polymerization, the initiator can be either an organometallic material such as an alkyl lithium, or the anion formed by electron transfer from a Group IA metal to an aromatic material such as naphthalene. A preferred organometallic material is an alkyl lithium such as sec-butyl lithium; the polymerization is initiated by addition of the butyl anion to either the diene monomer or to the styrene.

When an alkyl lithium initiator is used, a homopolymer of one monomer, e.g., styrene, can be selectively prepared, with each polymer molecule having an anionic terminus, and lithium gegenion. The carbanionic terminus remains an active initiation site toward additional monomers. The resulting polymers, when monomer is completely depleted, will usually all be of similar molecular weight and composition, and the polymer product will be "monodisperse" (i.e., the ratio of weight average molecular weight to number average molecular weight is very nearly 1.0). At this point, addition of 1,3-butadiene, isoprene or other suitable anionically polymerizable monomer to the homopolystyrene-lithium "living" polymer produces a second segment which grows from the terminal anion site to produce a living di-block polymer having an anionic terminus, with lithium gegenion.

Usually, one monomer or another in a mixture will polymerize faster, leading to a segment that is richer in that monomer, interrupted by occasional incorporation of the other monomer. This can be used to build a type of polymer referred to as a "random block polymer", or "tapered block polymer". When a mixture of two different monomers is anionically polymerized in a non-polar paraffinic solvent, one will initiate selectively, and usually polymerize to produce a relatively short segment of homopolymer. Incorporation of the second monomer is inevitable, and this produces a short segment of different structure. Incorporation of the first monomer type then produces another short segment of that homopolymer, and the process continues, to give a "random" alternating distribution of relatively short segments of homopolymers, of different lengths. Random block polymers are generally considered to be those comprising more than 5 such blocks. At some point, one monomer will become depleted, favoring incorporation of the other, leading to ever longer blocks of homopolymer, resulting in a "tapered block copolymer." An alternative way of preparing random or tapered block copolymers involves initiation of styrene, and interrupting with periodic, or step, additions of diene monomer. The additions are programmed according to the relative reactivity ratios and rate constants of the styrene and particular diene monomer.

"Promoters" are electron-rich molecules that facilitate anionic initiation and polymerization rates while lessening the relative differences in rates between various monomers. Promoters also influence the way in which diene monomers are incorporated into the block polymer, favoring 1,2-polymerization of dienes over the normal 1,4-cis-addition.

These polymers may have considerable olefinic unsaturation, which may be reduced, if desired. Hydrogenation to reduce the extent of olefinic unsaturation may be carried out to reduce approximately 90-99.1% of the olefinic unsaturation of the initial polymer, such that from about 90 to about 99.9% of the carbon to carbon bonds of the polymer are saturated. In general, it is preferred that these copolymers contain no more than about 10%, preferably no more than 5% and often no more than about 0.5% residual olefinic unsaturation on the basis of the total amount of olefinic double bonds present in the polymer prior to hydrogenation. Unsaturation can be measured by a number of means well known to those of skill in the art, including infrared, nuclear magnetic resonance spectroscopy, bromine number, iodine number, and other means. Aromatic unsaturation is not considered to be olefinic unsaturation within the context of this invention.

Hydrogenation techniques are well known to those of skill in the art. One common method is to contact the copolymers with, hydrogen, often at superatmospheric pressure in the presence of a metal catalyst such as colloidal nickel, palladium supported on charcoal, etc.

Hydrogenation may be carried out as part of the overall production process, using finely divided or supported, nickel catalyst. Other transition metals may also be used to effect the transformation. Other techniques are known in the art.

Other polymerization techniques such as emulsion polymerization can be used.

Examples of suitable commercially available regular linear diblock copolymers as set forth above include SV40™ and SV150™, both hydrogenated styrene-isoprene block copolymers, manufactured by Infineum USA. Examples of commercially available random block and tapered block copolymers include the various GLISSOVISCAL® styrene-butadiene copolymers manufactured by BASF.

The copolymers preferably have $M_n$ in the range of about 7000 to about 500,000, more preferably from about 20,000 to about 100,000. The weight average molecular weight ($M_w$) for these copolymers is generally in the range of about 10,000 to about 500,000, preferably from about 40,000 to about 200,000.

Copolymers of conjugated dienes with olefins containing aromatic groups, e.g., styrene, methyl styrene, etc. are described in numerous patents, for example, U.S. Pat. No. 3,554,911 describes a random butadiene-styrene copolymer, its preparation and hydrogenation.

(4) Star Polymer

Star polymers are polymers comprising a nucleus and polymeric arms. Common nuclei include polyalkenyl compounds, usually compounds having at least two non-conjugated alkenyl groups, usually groups attached to electron withdrawing groups, e.g., aromatic nuclei. The polymeric arms are often homopolymers and copolymers of dienes, preferably conjugated dienes, especially isoprene, vinyl substituted aromatic compounds such as monoalkenyl arenes, especially styrene, homopolymers of olefins such as butenes, especially isobutene, and mixtures thereof.

Molecular weights (GPC peak) of useful star polymers range from about 20,000, often from about 50,000 to about 700,000. They frequently have Mn ranging from about 50,000 to about 500,000.

The polymers thus comprise a poly(polyalkenyl coupling agent) nucleus with polymeric arms extending outward therefrom. The star polymers are usually hydrogenated such that at least 80% of the olefinic carbon-carbon bonds are saturated, more often at least 90% and even more preferably, at least 95% are saturated. As noted herein, the polymers contain olefinic unsaturation; accordingly, they are not exhaustively saturated before reaction with the carboxylic reactant.

The polyvinyl compounds making up the nucleus are illustrated by polyalkenyl arenes, e.g., di-vinyl benzene and poly-vinyl aliphatic compounds.

Dienes making up the polymeric arms are illustrated by butadiene, isoprene and the like. Monoalkenyl compounds include, for example, styrene and alkylated derivatives thereof. In one embodiment, the arms are derived from dienes. In another embodiment, the arms are derived from dienes and vinyl substituted aromatic compounds. In yet another embodiment, the arms comprise polyisobutylene groups, often, isobutylene-conjugated diene copolymers. Arms derived from dienes or from dienes and vinyl substituted aromatic compounds are frequently substantially hydrogenated. Star polymers are well known in the art.

Mixtures of two or more hydrocarbon polymers may be used.

Grafting Procedure: Acylating Agents-Graft Monomers

A graft monomer is next grafted onto the polymer backbone of the polymer substrate to form an acylated hydrocarbon polymer backbone intermediate, such as an acylated ethylene-alphaolefin polymer.

Suitable graft monomers include ethylenically unsaturated carboxylic acid materials, such as unsaturated dicarboxylic acid anhydrides and their corresponding acids. These carboxylic reactants which are suitable for grafting onto the polymers contain at least one ethylenic bond and at least one carboxylic acid or its anhydride groups or a polar group which is convertible into said carboxyl groups by oxidation or hydrolysis. The carboxylic reactants are selected from the group consisting of acrylic, methacrylic, cinnamic, crotonic, maleic, fumaric and itaconic reactants or a mixture of two or more of these. In the case of unsaturated ethylene copolymers or terpolymers, itaconic acid or its anhydride is useful due to its reduced tendency to form a cross-linked structure during the free-radical grafting process.

In one aspect, the ethylenically unsaturated acylating agent can be represented by formula (A) and/or formula (B):

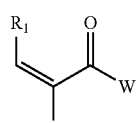

(A)

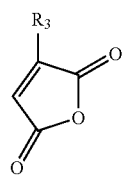

(B)

wherein $R_1$ is hydrogen or —CO—W', $R_2$ and $R_3$ are independently hydrogen or —CH$_3$; and W and W' are independently —OH, or alkoxyl having 1 to about 24 carbon atoms. Maleic anhydride or a derivative thereof is the preferred ethylenically unsaturated acylating agent.

The ethylenically unsaturated acylating agent may be grafted onto the copolymer backbone in a number of ways. It may be grafted onto the backbone by a thermal process known as the "ene" process or by grafting in solution or in melt form using a free-radical initiator. The free-radical induced grafting of ethylenically unsaturated acylating agents may carried out in solvents, such as hexane, heptane, mineral oil or aromatic solvents, it is carried out at an elevated temperature in the range of about 100° C. to about 250° C., preferably about 120° C. to about 190° C. and more preferably at about 150° C. to about 180° C., e.g. above 160° C., in a solvent preferably a mineral oil solution containing, e.g. about 1 wt % to about 50 wt %, preferably about 5 wt % to about 30 wt %, based on the initial total oil solution, of the polymer and preferably under an inert environment.

The ethylenically unsaturated carboxylic acid materials typically can provide one or two carboxylic groups per mole of reactant to the grafted copolymer. That is, methyl methacrylate can provide one carboxylic group per molecule to the grafted copolymer while maleic anhydride can provide two carboxylic groups per molecule to the grafted copolymer.

Free-Radical Initiator

The grafting reaction to form the acylated copolymers is in one embodiment generally carried out with the aid of a free-radical initiator either in bulk or in solution. The grafting can be carried out in the presence of a free-radical initiator dissolved in oil. The use of a free-radical initiator dissolved in oil results in a more homogeneous distribution of acylated groups over the olefin copolymer molecules.

The free-radical initiators which may be used to graft the ethylenically unsaturated carboxylic acid material to the polymer backbone include peroxides, hydroperoxides, peresters, and also azo compounds and preferably those which have a boiling point greater than 100 and decompose thermally within the grafting temperature range to provide free radicals. Representatives of these free-radical initiators are peroxides (diacyl peroxides such as benzoyl peroxide, dialkyl peroxides such as 1,1-bis(tert-butylperoxy)cyclohexane. 1,1-bis(tert-butylperoxy)-3,3,5-trimethylcyclohexane, 2,2-bis(tert-butylperoxy)butane, dicumylperoxide, tert-butyl-cumylperoxide, bis(tert-butylperoxyisopropyl)benzene, di-tert-butylperoxide (DTBP), 2,5-dimethyl-2,5-di(tert-butylperoxy)hexane, 2,5-dimethyl-2,5-di(tert-butylperoxy)-hexyne), hydroperoxides, peroxyesters such as tert-butyl peroxy benzoate, tert-butylperoxy acetate, O,O-tert-butyl-O-(2-ethylhexyl)monoperoxy carbonate, peroxketals such as n-butyl 4,4-di-(tert-butylperoxy)valerate and the like. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having acylating group, typified by a carboxylic acid or acid chloride, within its structure.

Grafting Reaction Equipment and Conditions

To perform the grafting reaction as bulk process, the graft monomer and copolymer are in one embodiment fed to an extruder, e.g., a single or twin screw extruder e.g. Werner & Pfleiderer's ZSK series, or a Banbury or other mixer, having the capability of heating and effecting the desired level of mechanical work (agitation) on the reactants for the grafting step.

In one embodiment, one can conduct grafting in an extruder, such as a twin-screw extruder. A nitrogen blanket is maintained at the feed section of the extruder to minimize the introduction of air. In another embodiment, the olefinic carboxylic acylating agent can be injected at one injection point, or is alternatively injected at two injection points in a zone of the extruder without significant mixing e.g. a transport zone. This results in an improved efficiency of the grafting and leads to a lower gel content.

Suitable extruders are generally known available for conducting grafting, and the prior dehydration procedure. The dehydration of the polymer substrate and subsequent grafting procedures can be performed in separate extruders set up in series. Alternatively, a single extruder having multiple treatment or reaction zones can be used to sequentially conduct the separate operations within one piece of equipment. Illustrations of suitable extruders are set forth, e.g., in U.S. Pat. Nos. 3,862,265 and 5,837,773, which descriptions are incorporated herein by reference.

In forming the acylated olefin copolymers, the olefin copolymer generally is fed into processing equipment such as an extruder, intensive mixer or masticator, heated to a temperature of at least 60° C., for example, 150° to 240° C., and the ethylenically unsaturated carboxylic acid reagent and free-radical initiator are separately co-fed to the molten copolymer to effect grafting. The reaction is carried out optionally with mixing conditions to effect grafting of the olefin copolymers. If molecular weight reduction and grafting can be performed simultaneously, illustrative mixing conditions are described in U.S. Pat. No. 5,075,383, which are incorporated herein by reference. The processing equipment is generally purged with nitrogen to prevent oxidation of the copolymer and to aid in venting unreacted reagents and byproducts of the grafting reaction. The residence time in the processing equipment is controlled to provide for the desired degree of acylation and to allow for purification of the acylated copolymer via venting. Mineral or synthetic lubricating oil may optionally be added to the processing equipment after the venting stage to dissolve the acylated copolymer. Other polymer backbones may be processed similarly.

The grafting reaction can be carried out in solvent-free or essentially solvent free environment. In one process, the grafting reaction preferably is performed in the absence of hydrocarbon solvents. The avoidance of hydrocarbon solvents during the grafting reaction (such as alkanes e.g., hexane or mineral oils), may eliminate or significantly reduces the risk and problem of undesired side reactions of such solvents during the grafting reaction which can form undesired grafted alkyl succinic anhydride by-products and impurities. Also, reduced amounts of transient unfunctionalized polymer (ungrafted polymer) are present after grafting in solventless grafting reactions, which results in a more active product. Therefore, the resulting copolymer intermediate is a more active product. A reduction is achieved in levels of undesirable grafted solvent (i.e., grafted hexyl succinic anhydride) and transient unfunctionalized (nongrafted) copolymer.

Accordingly, hydrocarbon solvents can be omitted according to certain embodiments of the present disclosure include solvents that generally are more volatile than the reactants of the grafting reaction described herein, for example, solvents having a boiling point less than about 150° C. under standard atmospheric pressure conditions (i.e., approximately 14.7 lb./in$^2$ absolute). The solvents that can be omitted include, for example, open-chain aliphatic compounds such as $C_9$ or lower alkanes, alkenes and alkynes (e.g., $C_5$ to $C_8$ alkanes such as hexane); aromatic hydrocarbons (e.g., compounds having a benzene nucleus such as benzene and toluene); alicyclic hydrocarbons such as saturated cyclic hydrocarbons (e.g., cyclohexane); ketones; or any combinations of these. In one embodiment, it is desirable to omit all solvents having boiling points approximating or lower than that of nonane under standard atmospheric conditions. Some conventional grafting reactions have been performed in the presence of considerable amounts of hydrocarbon solvent, such as approximately 15% to 60% hexane content. By comparison it may be preferable that the total amount of such solvents in the grafting reaction mass does not exceed 0.5 wt. % content thereof.

The grafted copolymer intermediate exits from the die face of the extruder either immediately after grafting, or after shearing and vacuum stripping (discussed below in more detail) if performed in different sections of the same extruder or a separate extruder arranged in series with the extruder in which grafting is conducted.

Selected Properties of Copolymer Intermediate

The resulting copolymer intermediate comprises an acylated copolymer characterized by having carboxylic acid acylating functionality randomly within its structure. The amount of carboxylic acid acylating agent (e.g., maleic anhydride) that is grafted onto the prescribed copolymer backbone (i.e., the copolymer substrate) is important. This parameter is referred to as the mass percentage of acylating agent on the acylated copolymer and generally is in the range of 0.5 to 3.0 wt. %, particularly in the range of 1.5 to 2.5 wt. %, and more particularly in the range of 1.7 to 2.3 wt. %, of carboxylic acid acylating agent grafted on the copolymer backbone. These numbers are more representative of the amount of carboxylic acid acylating agent being maleic anhydride and may be adjusted to account for agents having higher or lower molecular weights or greater or lesser amounts of acid functionality per molecule.

The wt. % of carboxylic acylating agent incorporated into the backbone can be determined either by infrared peak ratio analysis of acid or anhydride moiety versus copolymer alkyl functionality or by titration (Total Acid/Anhydride Number) (TAN) of the additive reaction product. The TAN value in turn can be used to estimate the degree of grafting of the carboxylic agent.

The carboxylic reactant is grafted onto the prescribed copolymer backbone to provide 0.15 to 0.75 carboxylic groups per 1000 number average molecular weight units (Mn) of the copolymer backbone, preferably 0.2 to 0.5 carboxylic groups per 1000 number average molecular weight. For example, a copolymer substrate with Mn of 20,000 is grafted with 3 to 15 carboxylic groups per copolymer chain or 1.5 to 7.5 moles of maleic anhydride per mole of copolymer. A copolymer with Mn of 100,000 is grafted with 15 to 75 carboxylic groups per copolymer chain or 7.5 to 37.5 moles of maleic anhydride per copolymer chain. The minimum level of functionality is the level needed to achieve the minimum satisfactory dispersancy and/or wear performance.

Molecular Weight Reduction of Copolymer Intermediate

The molecular weight of the acylated copolymer, i.e., the copolymer intermediate, may be reduced by mechanical, thermal, or chemical means, or a combination thereof. Techniques for degrading or reducing the molecular weight of such copolymers are generally known in the art. The number average molecular weight is reduced to suitable level for use in single grade or multigrade lubricating oils. In one embodiment, the initial copolymer intermediate has an initial number average molecular weight ranging from about 1,000 to about 500,000 upon completion of the grafting reaction. In one embodiment, to prepare an additive intended for use in multigrade oils, the copolymer intermediate's number average molecular weight is reduced down to a range of about 1,000 to about 80,000.

Alternatively, grafting and reduction of the high molecular weight copolymer may be done simultaneously. In another alternative, the high molecular weight copolymer may be first reduced to the prescribed molecular weight before grafting. As a representative example, when the olefin copolymer's average molecular weight is reduced before grafting, its number average molecular weight is sufficiently reduced to a value below about 80,000, e.g., in the range of about 1,000 to 80,000.

Reduction of the molecular weight of the copolymer intermediate, or the copolymer feed material during or prior to or after grafting, to a prescribed lower molecular weight typically is conducted in the absence of a solvent or in the presence of a base oil, using either mechanical, thermal, or chemical means, or combination of these means. Generally, the copolymer intermediate, or copolymer such as olefin copolymer, is heated to a molten condition at a temperature in the range of about 150° C. to about 350° C. and it is then subjected to mechanical shear, thermally or chemical induced cleavage or combination of said means, until the copolymer intermediate (or olefin copolymer) is reduced to the prescribed molecular weight. The shearing may be effected within an extruder section, such as described, e.g., in U.S. Pat. No. 5,837,773, which descriptions are incorporated herein by reference. The molecular weight reduction can be achieved by treatment of the free radical initiators or hydroperoxide as described, e.g., in U.S. Pat. No. 6,211,332, which descriptions are incorporated herein by reference. The molecular weight reduction can also be achieved, optionally in presence of base oils, in the presence of oxygen at specified temperature as described, e.g., in U.S. Pat. No. 6,362,286, which descriptions are incorporated herein by reference. Alternatively, mechanical shearing may be conducted by forcing the molten copolymer intermediate (or olefin copolymer) through fine orifices under pressure or by other mechanical means.

Vacuum Stripping of Unreacted Ingredients

Upon completion of the grafting reaction, unreacted carboxylic reactant and free radical initiator usually are removed and separated from the copolymer intermediate before further functionalization is performed on the copolymer intermediate. The unreacted components may be eliminated from the reaction mass by vacuum stripping, e.g., the reaction mass may be heated to temperature of about 150° C. to about 300° C. under agitation with a vacuum applied for a period sufficient to remove the volatile unreacted graft monomer and free radical initiator ingredients. Vacuum stripping preferably is performed in an extruder section equipped with venting means.

Pelletization of Copolymer Intermediate

The copolymer intermediate can be optionally pelletized before further processing in accordance with embodiments of the disclosure herein. Pelletization of the copolymer intermediate helps to isolate the intermediate product and reduce contamination thereof until further processing is conducted thereon at a desired time. Alternatively, further reaction to form the final imidized polymer can be done further without pelletizing the intermediate (discussed in more details in section below).

The copolymer intermediate can generally be formed into pellets by a variety of process methods commonly practiced in the art of plastics processing. These include underwater pelletization, ribbon or strand pelletization or conveyor belt cooling. When the strength of the copolymer is inadequate to form into strands, the preferred method is underwater pelletization. Temperatures during pelletization generally may not exceed 30° C. Optionally, a surfactant can be added to the cooling water during pelletization to prevent pellet agglomeration.

The mixture of water and quenched copolymer pellets is conveyed to a dryer such as a centrifugal drier for removal of water. Pellets can be collected in a box or plastic bag at any volume for storage and shipment. Under some conditions of storage and/or shipment at ambient conditions, pellets may tend to agglomerate and stick together. These can be readily ground by mechanical methods to provide high surface area solid pieces for easy and quick dissolution into oil.

Dissolution and Functionalization of Pelletized Copolymer Intermediate

Optionally, the pelletized copolymer intermediate may be supplied as an unground or ground form of the pellets. The pelletized acylated copolymer intermediate is dissolved in solvent neutral oil. The pellets generally are dissolved in the solvent at an introduction level of from about 5 wt. % to about 25 wt. %, particularly about 10 wt. % to about 15 wt. %, and more particularly about 12 wt. % to about 13 wt. % of the copolymer, based on the resulting solution (solute and solvent) viscosity.

The pelletized copolymer intermediate can be dissolved in the solvent neutral at temperature of, for example, about 120° C. to about 165° C. with mechanical stirring under a nitrogen blanket. The dissolving mixture is sparged with inert gas during the dissolution for about 2 to 16 hours. This treatment can be performed in a continuous stirred process vessel of suitable capacity.

The inert sparging gas can be nitrogen. The dissolution and sparging, if used, can be prior to the subsequent esterification procedure. One or more spargers are located within the vessel at locations submerged beneath the surface of the solution, preferably near the bottom of the solution, and bubble inert gas through the solution. Nitrogen sparging removes moisture from the dissolved copolymer intermediate and solvent oil. Importantly, the removal of moisture from the copolymer intermediate acts to convert any polymeric dicarboxylic diacids present back to the desired copolymeric dicarboxylic anhydride form.

For instance, where maleic anhydride is used as the grafting monomer, some portion of the pelletized copolymer intermediate may inadvertently transform to a copolymeric succinic diacid form. In general, this change is more apt to occur as a function of a longer shelf life. The conducting of nitrogen sparging during dissolution of the copolymer intermediate and prior to esterification has the benefit of converting the copolymeric succinic diacid back into the desired active polymeric succinic anhydride form before the copolymer intermediate is further reacted and functionalized (e.g., reacted with the hydroxyl-linked polycyclic hydrocarbon compound). Consequently, a more highly functionalized and active esterified product can be obtained in subsequent processing. The conversion of polymeric succinic diacid present back into the active polymeric succinic anhydride form can be monitored by measuring the viscosity of the solution. The solution viscosity decreases significantly from an initial higher value down to a steady-state value upon conversion of all or essentially all of the polymeric succinic diacid back into the desired polymeric succinic anhydride form.

Alternate Processes to Prepare the Functionalized Polymer Intermediate

The acylated copolymer can be further reacted with the hydroxyl-linked polycyclic hydrocarbon compound (having 3 to 6 contiguous fused carbocyclic rings wherein the carbocyclic ring is independently selected from 5 to 7 carbon atoms and the polycyclic hydrocarbon compound contains at least $5\pi$ bonds) of this invention in an extruder or mixing devices without being pelletized and/or dissolved in oil. Such process to carry out multi-reaction step in an extruder is described in more details in U.S. Pat. Nos. 5,424,367; 5,552,096; 5,565,161 which hereby is incorporated by reference. Such process can be carried out in a series extruder systems such as described in U.S. Pat. Application No. 2009247706 which hereby is incorporated by reference. Alternatively, the functionalized polymer can be made using two pass process in an extruder, wherein the first pass produces acylated copolymer intermediate which is fed to an second extruder, optionally connected to the first extruder, as an polymer melt or pellets to carry out further reaction with the hydroxyl-linked polycyclic hydrocarbon compound of the present invention. This process offers advantages by eliminating the dissolving of the acylated polymer intermediate in an mineral oil to carry out esterification reaction.

One more way to carry out the present invention is the form a graft monomer intermediate by first reacting an acylating agent with a hydroxyl-linked polycyclic hydrocarbon compound of the present invention to form a reaction product. The reaction product may include more than one chemical compound formed from the combination of the acylating agent and the hydroxyl-linked polycyclic hydrocarbon compound. The formed reaction product is then grafted to the polymer substrate in solution or in the melt process described above. This eliminates the needs to carry out esterification reaction on the acylated polymer substrate. Such process is disclosed in U.S. Pat. Nos. 7,371,713; 6,410,652; 6,686,321; 5,523,008; 5,663,126; 6,300,289; 5,814,586; 5,874,389 which hereby are incorporated as reference.

Base Oil

The neutral oil may be selected from Group I base stock, Group II base stock, Group III base stock, Group IV or poly-alpha-olefins (PAO), Group V, or base oil blends thereof. The base stock or base stock blend preferably has a saturate content of at least 65%, more preferably at least 75%; a sulfur content of less than 1%, preferably less than 0.6%, by weight; and a viscosity index of at least 85, preferably at least 100. These base stocks can be defined as follows:

Group I: base stocks containing less than 90% saturates and/or greater than 0.03% sulfur and having a viscosity index greater than or equal to 80 and less than 120 using test methods specified in Table 1 of the American Petroleum Institute (API) publication "Engine Oil Licensing and Certification Sheet" Industry Services Department, 14.sup.th Ed., December 1996, Addendum I, December 1998;

Group II: base stocks containing greater than or equal to 90% saturates and/or greater than 0.03% sulfur and having a viscosity index greater than or equal to 80 and less than 120 using test methods specified in Table 1 referenced above;

Group III: base stocks which are less than or equal to 0.03% sulfur, greater than or equal to 90% saturates, and greater than or equal to 120 using test methods specified in Table 1 referenced above.

Group IV: base stocks which comprise PAO's.

Group V: base stocks include all other base stocks not included in Group I, II, III, or IV.

For these definitions, saturates level can be determined by ASTM D 2007, the viscosity index can be determined by ASTM D 2270; and sulfur content by any one of ASTM D 2622, ASTM D 4294, ASTM D 4927, or ASTM D 3120.

Hydroxyl-linked Polycyclic Hydrocarbon Compound

The acylated polymer is reacted with a hydroxyl-linked polycyclic hydrocarbon having 3 to 6 contiguous fused rings where the rings are formed solely from carbon atoms but may be the same or different and contain at least $5\pi$ bonds to provide partial conjugation and delocalization in a planar ring system. Particularly suited contiguous fused rings may be ortho-fused or ortho- and peri-fused ring configurations. By employing mono reactive alcohols for the hydroxyl-linked polycyclic hydrocarbon, the degree of coupling and resulting viscosity increase or gelling of the reacted product may be controlled. For example, the addition of 2 equivalents of alcohol relative to maleic anhydride will give the di-carboxylic ester under appropriate reaction conditions. Additionally the charge mole ratio of the reactants and relative degree of reactivity of linked hydroxyl may be tailored for particular polymer backbones and degree of functionality, thus mixtures of hydroxyl-linked polycyclic hydrocarbon compounds may be employed. The reaction of the acylated polymer with a hydroxyl-linked polycyclic hydrocarbon is typically conducted via alcoholysis of the grafted maleic anhydride with a monohydric alcohol functionality on the polycyclic hydrocarbon to yield a carboxylic ester and carboxylic acid (or predominantly carboxylic ester depending upon the charge mole ratio and reaction conditions). The linked hydroxyl is selected to be a reactive alcohol functionality under the reaction process conditions and is independent of a hydroxyl functionality directly attached to an aromatic ring.

The functionalization reaction is relatively fast and typically requires no catalyst, although acid or base catalysts may be used. Furthermore, if the free carboxylic acid moiety is to be reacted, it may require additional reaction conditions and/or the addition of a second selected alcohol. Thus in one aspect, a second hydroxyl-linked polycyclic hydrocarbon may be added in a stepwise reaction commonly with the more reactive species added later the reaction.

Alternatively, a second alcohol may be a suitable reactant to react with the carboxylic acid moiety. These second alcohols may be aliphatic alcohols, cycloaliphatic alcohols, monohydroxy polyethers, etc. Preferably being primary or secondary alkanols containing from 1 to 100 carbon atoms, more preferably up to about 28 carbon atoms. Example include methanol, ethanol, butanols, isomeric octanols and decanols, octadecanol, behenyl alcohol, neopentyl alcohol, cycloalkanols preferably having alkanol attached to the cycloaliphatic group for example cyclohexylmethanol and the like, benzyl alcohol, beta phenylethyl alcohol, phenoxybenzyl alcohol, naphtyl alkanols having from one to ten carbon atoms such as napthyl ethanol, naphthyl butanol and the like. Particularly suited alcohols are alkylalcohols. Examples of typical alcohols include n-propanol, n-butanol, 1-pentanol, 1-hexanol, 1-heptanol, and mixed isomers of each of the foregoing alcohols including branched- or straight-chain alcohols. 1-Hexanol or hexanol isomers are preferred. Examples of commercial alcohols available from ExxonMobil Chemical that are a mix of several isomers include Exxal 6 (hexyl alcohol) and Exxal 7 (isoheptyl alcohol).

Other suitable monohydroxy alcohol compounds, are often termed monohydroxy polyethers, or polyalkylene glycol monohydrocarbyl ethers, or "capped" poly(oxyalkylene)glycols and are to be distinguished from the poly(oxyalkylene) glycols, or polyols, which are not hydrocarbyl-terminated, i.e., not capped. The hydrocarbyl terminated poly(oxyalkylene)alcohols are produced by the addition of lower alkylene oxides, such as oxirane, ethylene oxide, propylene oxide, the butylene oxides, or the pentylene oxides to the hydroxy compound $R_pOH$ under polymerization conditions, wherein $R_p$ is the hydrocarbyl group which caps the poly(oxyalkylene) chain. Methods of production and properties of these polymers are disclosed in U.S. Pat. Nos. 2,841,479 and 2,782,240, and Kirk-Othmer's "Encyclopedia of Chemical Technology", Volume 19, p. 507. In the polymerization reaction, a single type of alkylene oxide may be employed, e.g., propylene oxide, in which case the product is a homopolymer, e.g., a poly(oxypropylene) propanol. However, copolymers are equally satisfactory and random copolymers are readily prepared by contacting the hydroxyl-containing compound with a mixture of alkylene oxides, such as a mixture of propylene and butylene oxides. Block copolymers of oxyalkylene units also provide satisfactory poly(oxyalkylene)polymers for use in the present invention. In general, the poly(oxyalkylene) polymers are mixtures of compounds that differ in polymer chain length. However, their properties closely approximate to those of the polymer represented by the average composition and molecular weight. Typically the one or more hydrocarbyl-terminated poly(oxyalkylene)polymers comprise oxyalkylene units containing from 2 to 5 carbon atoms. The hydrocarbyl group generally contains from 1 to 30 carbon atoms, preferably from 2 to 20 carbon atoms. Preferably the oxyalkylene units contain 3 or 4 carbon atoms. Each poly (oxyalkylene)polymer contains at least 2 oxyalkylene units, preferably 5 to 100 oxyalkylene units, more preferably 10 to 100 units and most preferably 10 to 25 such units. In general, the oxyalkylene units may be branched or unbranched. A poly(oxyalkylene)polymer chain composed of branched three and/or four carbon oxyalkylene units in at least sufficient amount to effect solubility in a lubricating oil composition is most preferred. The preferred poly(oxyalkylene) compounds are composed, at least in part, of the branched oxyalkylene isomers, particularly oxypropylene, and oxybutylene units which are obtained from 1,2-propylene oxide and from 1,2-butylene oxide, respectively. The hydrocarbyl moiety ($R_p$—) which terminates the poly(oxyalkylene) chain contains from 1 to 30 carbon atoms, preferably from 2 to 20 carbon atoms, and is generally derived from a monohydroxy compound ($R_pOH$) which is the initial site of the alkylene oxide addition in the polymerization reaction. Such monohydroxy compounds are preferably aliphatic or aromatic alcohols of from 1 to 30 carbon atoms, more preferably an alkanol or an alkylphenol, and most preferably an alkylphenol wherein the alkyl is a straight- or branched-chain of from 1 to 24 carbon atoms. The hydrocarbyl component of the poly (oxyalkylene) moiety preferably denotes an organic radical composed of carbon and hydrogen which may be aliphatic, alicyclic, aromatic or combinations thereof, i.e., aralkyl. Preferably, the hydrocarbyl group will be relatively free of aliphatic unsaturation, i.e., ethylenic and acetylenic, particularly acetylenic unsaturation.

Preferably the polycyclic hydrocarbon is a polyaromatic hydrocarbon having fused rings having at least two benzenoid rings and wherein the carbocyclic ring has from 5 to 7 carbon atoms. The linker group is selected from the group consisting of a hydroxy-alkylene group from 1 to 10 carbon atoms, preferably hydroxymethyl- or hydroxyethyl-, alkoylated derivatives of the above including monool polyether or optionally a thioether group having hydroxyl-alk-(oxy-alk)$_n$-oxy or hydroxyl-alk-(oxy-alk)$_n$-thio linker where alk in each instance is independently alkylene selected from 2 to 6 carbon atoms and n is an integer from 1 to 100.

In one aspect the preferred compounds can be monohydric alcohols of the formula A-X—OH where A is a polyaromatic hydrocarbon having 3 to 6 contiguous fused carbocyclic rings having at least two benzenoid rings and wherein the carbocyclic ring has from 5 to 7 carbon atoms, X is selected from -alkylene $C_{1-10}$ carbon atoms-, —(O-alkylene $C_{2-6}$ carbon atoms)-, —(O-alkylene $C_{2-6}$ carbon atoms)$_n$- wherein n is an integer from 5-100. The A group may be optionally substituted with 1 to 3 substituents selected from hydroxyl, alkyl, alkyloxy where alkyl is $C_{1-10}$ carbon atoms or aryl (benzyl or napthyl). Alkylene is a divalent group which may be straight chain or branched. In one aspect, the monohydric alcohol of the formula A-X—OH is a primary alcohol.

In one aspect the polyether linker is based upon linking polymers derived from $C_2$-$C_6$ epoxides such as ethylene oxide, propylene oxide and butylene oxide and may contain from 5 to 100 oxyalkylene units having 2 to 6 carbon atoms in each oxyalkylene unit, more preferably 5 to 50 oxyalkylene units. Homopolymer and copolymer including random and block are well known by selecting the particular oxyalkylene group(s). Random copolymers are more easily prepared when the reactivities of the oxides are relatively equal. In certain cases when ethylene oxide is copolymerized with other oxides, the higher reaction rate of ethylene oxide makes the preparation of random copoloymer more difficult. In either case, block copolymers can be prepared. Block copolymers are prepared by contacting the hydroxyl containing polycyclic hydrocarbon compound with a first alkylene oxide, then others in any order, or repetitively, under polymerization conditions to form the desired poly(oxyalkylene) linker.

Preferred 3 contiguous ring compounds include: acenaphthene, acenaphthylene, anthracene, fluorine, phenalene, and phenanthrene and further which may include partially saturated rings such as 9,10 dihydro-anthracene, tetrahydro-anthracene, dihydro-phenalene. Preferred 4 ring contiguous ring compounds include; benzo[b]fluorine, benzo[c]phenanthrene, ben[a]antracene, chrysene fluoranthene, napthacene, pyrene triphenylene and the like including the partially saturated analogs thereof. Preferred 5 ring contiguous ring compounds include: benzo[a]naphthacene, benzo[a]pyrene, benzo[b]chrysene, benzo[c]chrysene, benzo[e]pyrene, benzo [ghi]fluoranthene, benzo[j]fluoranthene, benz[e]acephenanthrylene, dibenz[a,h]antrhracene, diben[a,c]anthracene, dibenz[a,j]anthracene, naphtha[a]antracene, pentacene, pentaphene, perylene, picene and further which may include partially saturated rings. Preferred 5 ring contiguous ring compounds include: benzo[ghi]perlene, dibenzo[b,def]chrysene, dibenxo[g,p]chrysene, phenanthro[3,4-c]phenanthrene and further which may include partially saturated rings.

One aspect, the polycyclic hydrocarbon having 3 to 6 contiguous fused rings is hydroxyl alkylene monohydric alcohol. Particularly preferred groups are hydroxymethyl- and hydroxyethyl-groups. Examples of suitable compounds are 9-anthracenemethanol, 9-fluorenemethanol, 1-pyrenemethanol, 3-perylenemethanol, 4-phenanthrylmethanol, 3-phenanthrylmethanol, 1-(3-phenanthryl)ethanol, 1-(9-phenanthryl) ethanol, 1-(9-phenanthryl)ethanol, 1-(2-phenanthryl) ethanol, 1-(2-anthryl)ethanol, 1-(9-anthryl)ethanol, 2-(9-anthryl)ethanol, 1-(9H-fluoren-9-yl)ethanol and the like.

One aspect the polycyclic hydrocarbon having 3 to 6 contiguous fused rings is hydroxyl monohydric alcohol which may be ethoxylated with ethylene oxide, ethylene carbonate and the like. Particularly suited compounds may be selected from the group 9-phenanthrenol, 1-phenanthrenol, 1-pyrenol, 8-methoxy-3-phenanthrenol, 1-acenaphthenol, 9H-fluoren-3-ol, 9H-fluoren-2-ol, 9,10-dihydro-antracene-9-ol, anthracen-9-ol and the like.

The hydroxyl-linked polycyclic hydrocarbon having 3 to 6 contiguous fused rings where the rings are formed solely from carbon atoms but may be the same or different and contain at least 5π bonds may optionally be substituted groups selected from 1 to 3 substituent groups selected from alkyl, alkoxy, aryl, alkaryl, arylalkyl, aryloxy, wherein preferably alkyl is straight or branched chain carbon having less than 8 carbon atoms and more preferably alkyl is from $C_1$ to $C_6$. Particularly preferred aryl groups are phenyl or naphthyl. Preferred arylalkyl groups include the groups in which one hydrogen of the alkyl group is substituted with an aryl group and include, for example benzyl, phenethyl, phenpropyl, napthylmethyl, naphthylethyl, naphthylpropyl. Preferred aryloxy groups include phenoxy and naphthyloxy particularly 1-naphthyloxy and 2-naphthyloxy.

Particularly suited hydroxyl-linked polycyclic hydrocarbons are exemplified and selected from the group consisting of 9-anthracenemethanol, 1-pyrenemethanol, 2-(9-anthracenyloxy)ethanol, and 2-(9-anthracenylmethoxy)ethanol.

An inert solvent is often used to facilitate handling and to promote good contacting of the reactants. When employed, examples of inert solvents include heptane, benzene, toluene, chlorobenzene and 250 thinner which is a mixture of aromatics, paraffin's and naphthenes. Kerosene-type jet fuel is another example of the latter mixture. Other examples of inert solvents that are aromatic mixtures include Exxon Aromatic 100, Exxon Aromatic 150, Solvesso 100, Total Solvarex 9 and the like. Other solvents such as neutral base oils and diluent oils apparent to those skilled in the art may also be used.

The reaction between the copolymer substrate intermediate having grafted thereon carboxylic acid acylating function and the prescribed hydroxyl-linked polycyclic hydrocarbon compound is preferably conducted by heating a solution of the copolymer substrate under inert conditions and then adding the hydroxyl-linked polycyclic hydrocarbon compound to the heated solution generally with mixing to effect the reaction. It is convenient to employ an oil solution of the copolymer substrate heated to 120° C. to 175° C., while maintaining the solution under a nitrogen blanket. The hydroxyl-linked polycyclic hydrocarbon compound is added to this solution and the reaction is effected under the noted conditions.

The hydroxyl-linked polycyclic hydrocarbon functionalized acylated copolymer substrate of the present disclosure can be incorporated into lubricating oil in any convenient way. Thus, the grafted, multi-functional copolymers reaction product can be added directly to the lubricating oil by dispersing or dissolving the same in the lubricating oil at the desired level of concentration. Such blending into the lubricating oil can occur at room temperature or elevated temperatures. Alternatively, the reaction product can be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 45 wt. %, and preferably from about 10 to about 35 wt. %, grafted, multi-functional hydroxyl-linked polycyclic hydrocarbon copolymer additive, and typically from about 20 to 90 wt %, preferably from about 40 to 60 wt % base oil based on the concentrate weight.

Lubricating oils containing the hydroxyl-linked polycyclic hydrocarbon functionalized acylated copolymer substrate of the present disclosure may be beneficially employed directly, or alternatively as pre-diluted in base oil in concentrate form as typically used for lubricating oil additives. Suitable base oil have been described herein.

Advantageous results are also achieved by employing the additive mixtures of the present disclosure in base oils conventionally employed in and/or adapted for use as crankcase lubricating oil compositions, power transmitting fluids, heavy duty hydraulic fluids, power steering fluids and the like. Gear lubricants, industrial oils, pump oils and other lubricating oil compositions can also benefit from the incorporation therein of the additive mixtures of the present disclosure. These lubricant compositions are particularly suited for use to lubricate internal combustion engines (e.g., heavy duty diesel engines, including types equipped with exhaust gas recirculator (EGR) systems), automotive vehicle transmissions, gears and other mechanical devices and components. Lubricant compositions containing the additive reaction product of certain embodiments of the present disclosure have improved soot dispersing (deagglomeration), deposit control, and boundary film formation performance and wear performance in comparison to standard VI improvers or in the absence of the additive. The improved boundary film formation performance in soot-containing oils aids in protecting against engine wear from the soot. In one aspect, the additive reaction product can be added to lubricating compositions in an amount sufficient to reduce the amount of oil thickening of the lubricating oil due to soot content; especially in exhaust gas recirculation (EGR) equipped diesel engines. In another aspect, the additive reaction product can be added to lubricating compositions in an amount sufficient to reduce the amount to positively influence wear performance of the lubricating oil due in part to soot content, especially in exhaust gas recirculation (EGR) equipped diesel engines. In this regard, one aspect is directed to a method of operating a heavy duty diesel engine optionally provided with a cooled exhaust gas recirculation system comprising lubricating said engine with a lubricating oil composition comprising a major amount of an oil of lubricating viscosity and a minor amount of the amine functionalized acylated copolymer substrate of the present disclosure.

These lubricating oil formulations conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoaming agents, demulsifiers and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the grafted, multi-functional olefin hydroxyl-linked polycyclic hydrocarbon copolymer would usually be employed in the form of a 10 to 50 wt. % concentrate, for example, in a lubricating oil fraction. In one embodiment, the amount of the grafted, multi-functional olefin hydroxyl-linked polycyclic hydrocarbon copolymer dispersant viscosity improver in a finished lubricating oil is from about 0.1 weight percent to about 10 weight percent, and particularly about 0.2 weight percent to about 2.5 weight percent and more preferably 0.2 weight percent to about 0.8 weight percent.

The following examples are presented to illustrate specific embodiments of this invention and are not to be construed in any way as limiting the scope of the invention. Unless indicated otherwise, all parts are parts by weight, temperatures are in degrees Celsius, and pressures in millimeters mercury (mm Hg). Any filtrations are conducted using a diatomaceous earth filter aid. Analytical values are obtained by actual analysis.

Polymer Analyses

The ethylene contents as an ethylene weight percent ($C_2$ wt %) for the ethylene-based copolymers are typically determined according to ASTM D3900.

The number average molecular weight of the polymers were determined using Gel Permeation Chromatography (GPC) using trichlorobenzene (TCB) as solvent at 145° C. using a triple detection method with polystyrene calibrations.

Thickening efficiency (TE) is a measure of the thickening ability of the polymer in oil, and is defined as: $TE=2/c \times \ln((kv_{(polymer+oil)})/kv_{oil})/\ln(2)$, where c is the concentration of the polymer and kv is kinematic viscosity at 100° C. according to ASTM D445. The shear stability index (SSI) is an indication of the resistance of polymers to permanent mechanical shear degradation in an engine. The SSI can be determined by passing a polymer-oil solution for 30 cycles through a high shear Bosch diesel injector according to the procedures listed in ASTM D6278. The SSI of a polymer can be calculated from the viscosity of the oil without polymer and the initial and sheared viscosities of the polymer-oil solution using:

$$SSI = 100 \times (kv_{(polymer+oil),fresh} - kv_{(polymer+oil),sheared}) / (kv_{polymer+oil),fresh} - kv_{oil,fresh})$$

EXAMPLES

Examples 1-4

Preparation of Acylated Ethylene-Falpha Olefin Copolymer (OCP)

The acylated ethylene-alpha olefin copolymers (OCP) were prepared by free radically grafting maleic anhydride using peroxide in a counter-rotating twin screw extruder on to various ethylene-propylene backbones as listed in Table 1.

Example 1 was prepared in a twin-screw extruder by grafting maleic anhydride with peroxide in absence of solvent. The reaction conditions and molar proportions of maleic anhydride, peroxide initiator, and ethylene-propylene copolymer were controlled to obtain desired maleic anhydride grafting level and the number average molecular weight as mentioned in Table 1. The unreacted maleic anhydride and peroxide decomposition products were removed with vacuum stripping prior to pelletizing the acylated polymers.

Acylated ethylene-alpha olefin copolymer of Example 2 was received from a commercial supplier.

Acylated ethylene-alpha olefin copolymer in Example 3 was prepared in a laboratory extruder under the following conditions: granulated ethylene-alpha olefin copolymer, maleic anhydride, peroxide and poly-alpha olefin (PAO) having kinematic viscosity at 100° C. of 4 cSt were pre-mixed in container to obtain a uniform coating of the oil and reagents on the pellets. The amount of the PAO was around 1 wt % of the mixture. Peroxide used was either di-cumyl peroxide or di-tertiary butyl peroxide. The mixture was then fed to co-rotating twin-screw extruder operating at screw speed of 150 rpm and following temperature profile along the extruder: 100° C., 140° C., 225° C., 225° C. with the die at 225° C. The grafting level was varied by changing maleic anhydride content in the feed mixture and/or peroxide. Excess reagents were removed with vacuum stripping prior to die and the extruded polymer was recovered. The maleic anhydride content was determined by FTIR or by titration with tetra-butyl ammonium hydroxide.

Acylated polyisoprene ("PIP") in Example 4 was prepared as follows:

To a 1 L glass kettle reactor were added 186.2 g of polyisoprene (39K Mn) and 187.2 of a 100N diluent oil. The mixture was heated with agitation under a $N_2$ blanket. When the mixture reached 140° C., 4.29 g of solid maleic anhydride was charged to the reactor. Heating and agitation continue under $N_2$ to 200° C., and the reaction was held at these conditions for 3 h. Vacuum was then applied (<50 mmHg) for 40 min to remove any residual maleic anhydride. Titration (ASTM D94) analysis of the product indicated that 1.8 wt % of maleic anhydride was grafted onto the polyisoprene.

TABLE 1

Properties of polymer backbone

| Example (acylated backbone) | Ethylene-alpha olefin copolymer (OCP) type | Ethylene Content, wt % | $M_n$ of acylated copolymer, kDa | Maleic Anhydride content, wt % | Thickening Efficiency (acylated copolymer) | Shear Stability Index, % (acylated copolymer) | Concentrate (polymer/oil) (wt/wt) |
|---|---|---|---|---|---|---|---|
| Comparative | — | — | — | 0 | — | — | — |
| 1 | OCP-1 | 11 | 49,730 | 1.5 | 1.08 | 8 | 10/90 |
| 2 | OCP-2 | 49 | 12,000[a] | 1.2[a] | — | — | 30/70 |
| 3 | OCP-3 | 49 | 39,250 | 2.0 | 1.85 | 30 | 7/93 |
| 4 | PIP-1 | N/A | 39,000[a] | 1.8 | 0.39 | 3 | 50/50 |

[a] = data from manufacturer

The maleated copolymer was dissolved in a base oil depending on the polymer backbone as shown in Table 1.

Examples 5-12

Alcohol Function Groups

Many of the aromatic containing alcohols used in the current invention are commercially available and were purchased from a third party supplier (See Table 2). Those alcohols that were not readily available in the quantities needed for testing were synthesized using methods known to those skilled in the art.

TABLE 2

Alcohol Functional groups

| Example | Alcohol | Aromatic Group | # of Contiguous Aromatic Rings | Availability |
|---|---|---|---|---|
| 5-C | 2-Naphthol | Naphthol | 2 | Sigma-Aldrich Co. ® |
| 6-C | Benzyl alcohol | Benzyl | 1 | Sigma-Aldrich Co. ® |
| 7-C | 3-phenoxybenzyl alcohol | Benzyl | 1 | Sigma-Aldrich Co. ® |
| 8-C | 2-naphthylmethanol | Naphthyl | 2 | Sigma-Aldrich Co. ® |
| 9 | 9-anthracenemethanol | Anthracenyl | 3 | Sigma-Aldrich Co. ® |
| 10 | 1-pyrenemethanol | Pyrenyl | 4 | Sigma-Aldrich Co. ® |
| 11 | 2-(9-anthracenylmethoxy)ethanol | Anthracenyl | 3 | Prepared |
| 12 | 2-(9-anthracenyloxyethanol | Anthracenyl | 3 | Prepared |

Example 11

Synthesis of 2-(9-anthracenylmethoxy)ethanol

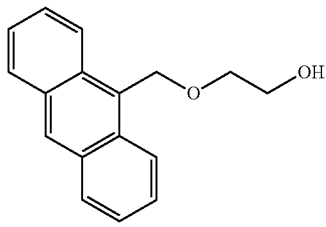 [SMILES: OCCOCc1c2ccccc2cc2ccccc12]

Sodium hydride (1.12 g, 27.9 mmole) was added to a 100 mL flask under an inert atmosphere. Anhydrous tetrahydrofuran (THF) (10 mL) was added to form a suspension. To a separate flask was added ethylene glycol (1.42 mL, 25.4 mmole) and 3 mL anhydrous THF. The resulting solution was added dropwise to the sodium hydride suspension over 20 minutes. The resulting reaction mixture was then stirred for 30 min at room temperature.

To a separate flask under an inert atmosphere was added 9-bromoethylanthracene, 10 mL anhydrous THF, and 5 mL anhydrous dimethylsulfoxide. The resulting mixture was added to the solution prepared above. The resulting reaction mixture was then stirred for 15 hrs at room temperature. The mixture was then slowly quenched using saturated $NaHCO_3$. The products were extracted with dichloromethane and dried over sodium sulfate. The solvents were evaporated under reduced pressure and purified using flash column chromatography.

$^1$H NMR ($CDCl_3$, 400 MHz) δ 8.47 (s, 1H), 8.38 (d, J=8.9 Hz, 2H), 8.02 (d, J=8.5 Hz, 2H), 7.59-7.53 (m, 2H), 7.51-7.46 (m, 2H), 5.53 (s, 2H), 3.79-3.70 (m, 4H).

Example 12

Synthesis of 2-(9-anthracenyloxy)ethanol

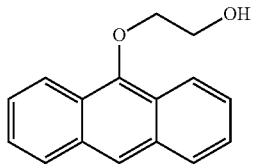 [SMILES: OCCOc1c2ccccc2cc2ccccc12]

To a solution of anthrone (5.0 g, 25.7 mmole) in 34 mL anhydrous DMF under an inert atmosphere was added potassium carbonate (7.47 g, 54.1 mmole). To the resulting reaction mixture was added 2-bromoethanol (2.0 mL, 28.3 mmole). The resulting reaction mixture was stirred for 1 hr at room temperature, then 3 hrs at 80° C. The reaction was then cooled to room temperature and quenched with saturated $NaHCO_3$. Ethyl acetate was added and the organic layer was collected and dried over magnesium sulfate. The solvent was concentrated under reduced pressure and the residue was purified via flash chromatography.

$^1$H NMR ($CDCl_3$, 400 MHz) δ 8.35-8.30 (m, 2H), 8.25 (s, 1H), 8.03-7.97 (m, 2H), 7.52-7.44 (m. 4H), 4.36-4.31 (m, 2H), 4.21-4.16 (m, 2H), 2.43 (dd, J=6.46, 1H).

Examples 13-23

Reaction of Acylated Olefin Copolymers with Aromatic Alkyl Alcohols

General procedure for the preparation of functionalized polymers: A sample of acylated polymer was dissolved in base oil to form a concentrate as indicated in Table 1. The concentrate was added to a kettle reactor at room temperature. The alcohol (2.0 equivalents relative to maleic anhydride) was subsequently added at room temperature. The reaction mixture was then heated to 160° C. and stirred under an active flow of nitrogen for 3 hours. The reaction product was cooled to room temperature.

Conversion of acylated polymer to the desired product was confirmed by FTIR analysis. While 2 equivalents of alcohol were used, signals corresponding to the unreacted anhydride, ester and carboxylic acid were commonly seen. The materials if desired could be removed by standard methods, however typically such unreacted reactants, side reaction products and by-products need not be removed and may provide improved functionality.

The acylated backbones as listed in Table 1 were reacted with the aromatic alcohols listed in Table 2 as shown in Examples 13 to 23 (Table 3). Several comparative examples were synthesized to illustrate the present invention. Example 13-C was an attempt to react 2-naphthol itself with the maleated OCP, however, no reaction was observed under the standard reaction conditions. In contrast, 2-naphthylmethanol reacted with the anhydride to form the desired product (Example 16). Likewise, benzylalcohol, 3-phenoxybenzylalcohol, 9-anthracenylmethanol, and 1-pyrenemethanol all reacted to form the reaction products (Examples 14-18). This series was made to illustrate the importance of contiguous ring systems. 2-(9-anthracenylmethoxy)ethanol and 2-(9-anthracenyloxy)ethanol were reacted with the same polymer backbone to illustrate different linkers between the hydroxyl functionality and the aromatic system (Examples 19-20). Finally, Examples 21-23 were prepared to explore different acylated backbones.

TABLE 3

Synthesis of functionalized polymers 13-23

| Example | Acylated Polymer | Alcohol |
|---|---|---|
| 13-C | OCP-1 | 2-Naphthol |
| 14-C | OCP-1 | Benzyl alcohol |
| 15-C | OCP-1 | 3-phenoxybenzyl alcohol |
| 16-C | OCP-1 | 2-naphthylmethanol |
| 17 | OCP-1 | 9-anthracenemethanol |
| 18 | OCP-1 | 1-pyrenemethanol |
| 19 | OCP-1 | 2-(9-anthracenylmethoxy)ethanol |
| 20 | OCP-1 | 2-(9-anthracenyloxy)ethanol |
| 21 | OCP-2 | 9-anthracenemethanol |
| 22 | OCP-3 | 9-anthracenemethanol |
| 23 | PIP-1 | 9-anthracenemethanol |

Examples 24 to 34

HFRR Wear Performance

Examples 24 to 34, which exemplify the lubricating oil additive composition of the present invention, were evaluated for High Frequency Reciprocating Rig (HFRR) wear bench test in presence of a soot surrogate. The HFRR bench test measures the average wear scar diameter on the ball specimen after subjecting it to a reciprocating sliding motion at specified load in presence of lubricant oil pre-loaded with carbon black. The wear scar is reported as an average of diameters in both the parallel and perpendicular to the sliding direction. The data reported in examples 24 to 34 is average of the three repeat measurements.

The wear scar diameter measured for the additive compositions of Examples 24 to 34 in formulated oil were compared to formulated oil that does not contain the lubricating oil additive composition of the present invention. The lubricating oil used was fully-formulated SAE 5W-30 lubricant oil blended with API Group III base stocks and additives including detergents, dispersants, zinc dialkyldithiophosphate, antioxidants, an anti-foam agent, a pour point depressant, a friction modifier, the additive of the present invention, and a non-functionalized viscosity index improver. The net active content of the additive of the present invention added to the lubricant oil examples are shown in Table 4. The SAE 5W-30 lubricant oil was blended to the kinematic viscosity at 100° C. of ca. 12.2+/−0.3 cSt. The results of the HFRR wear bench test according to the invention are summarized in Table 4.

formulated oil that does not contain the lubricating oil additive composition of the present invention. The formulated oil of the present invention comprises 0.66 wt % of an oxidation inhibitor package, 0.33 wt % pour point depressant, 4.07 wt % of a calcium based detergent package containing a phenate and sulfonates, 2.41 wt % zinc dithiophosphate, 0.03 wt % foam inhibitor, 7.7 wt % viscosity index improver and 85.10 wt % of a lube oil blend which is a mixture of basestocks that consists of 69.24 wt % Exxon150N oil, and 30.76 wt % Exxon 600N oil (all of which may be purchased from ExxonMobil Corporation, Fairfax, Va.) to provide the comparative oil formulation. To prepare the formulated lubricating oil composition of the present invention, approximately 6 wt % of the additive composition (concentrate) made from the backbone and alcohols as shown in Table 3 was top treated to the formulated comparison oil. The results of the soot thickening bench test are shown in Table 5.

TABLE 4

HFRR Wear Performance

| Example | Functionalized Product | Polymer | Alcohol | Net Active Treat Rate, wt % | Avg. Wear Scar diameter, micron |
|---|---|---|---|---|---|
| 24-C | NA | None | None | — | 180 |
| 25-C | 14 | OCP-1 | Benzyl alcohol | 0.5 | 156 |
| 26-C | 15 | OCP-1 | 3-phenoxybenzyl alcohol | 0.5 | 149 |
| 27-C | 16 | OCP-1 | 2-naphthylmethanol | 0.5 | 143 |
| 28 | 17 | OCP-1 | 9-anthracenemethanol | 0.5 | 127 |
| 29 | 18 | OCP-1 | 1-pyrenemethanol | 0.5 | 123 |
| 30 | 19 | OCP-1 | 2-(9-anthracenylmethoxy)ethanol | 0.5 | 125 |
| 31 | 20 | OCP-1 | 2-(9-anthracenyloxy)ethanol | 0.5 | 129 |
| 32 | 21 | OCP-2 | 9-anthracenemethanol | 0.5 | 127 |
| 33 | 22 | OCP-3 | 9-anthracenemethanol | 1.0 | 132 |
| 34 | 23 | PIP-1 | 9-anthracenemethanol | 1.0 | 131 |

As can be seen from the results, all of the functionalized polymers gave improved performance over the baseline comparative (Example 24). Examples 25-29 exemplify the importance of the number of contiguous aromatic rings with a small improvement seen from moving from benzyl to naphthol, but a much larger improvement when three contiguous aromatic systems are employed. The best results were obtained when using the four ring system, pyrene. Examples 30 and 31 illustrate that linker groups other than hydroxymethyl are suitable for this invention. Examples 32-34 illustrate that several different olefin copolymers of varying composition, MA level, and Mn are effective in this invention.

Soot Thickening Bench Test

Examples 14-23 were further evaluated for percent viscosity increase using a soot thickening bench test, which measures the ability of the formulation to disperse and control viscosity increase resulting from the addition of carbon black, a soot surrogate. Using the soot thickening bench test, the viscosity of a fresh oil is measured in centistokes. The viscosity of the oil containing carbon black is measured according to methods that are well known in the art. The percent viscosity increase is calculated according to the following formula:

% viscosity increase=[(vis$_{cbo}$−vis$_{fo}$)/(vis$_{fo}$)×100]

vis$_{cbo}$: viscosity of carbon black in oil
vis$_{fo}$: viscosity of fresh oil Using the soot thickening bench test, the percent viscosity increase calculated for the additive compositions of Examples 14-23 in a formulated oil were compared to a

TABLE 5

Soot Dispersancy Bench Test

| Example | Functionalized Product | Polymer | Functional Group | % Viscosity Increase |
|---|---|---|---|---|
| 35-C | NA | None | None | 242 |
| 36-C | 14 | OCP-1 | Benzyl alcohol | 209 |
| 37-C | 15 | OCP-1 | 3-phenoxybenzyl alcohol | 237 |
| 38-C | 16 | OCP-1 | 2-naphthylmethanol | 209 |
| 39 | 17 | OCP-1 | 9-anthracenemethanol | 86 |
| 40 | 18 | OCP-1 | 1-pyrenemethanol | 56 |
| 41 | 19 | OCP-1 | 2-(9-anthracenylmethoxy)ethanol | 142 |
| 42 | 20 | OCP-1 | 2-(9-anthracenyloxy)ethanol | 135 |
| 43 | 21 | OCP-2 | 9-anthracenemethanol | 36 |
| 44 | 22 | OCP-3 | 9-anthracenemethanol | 39 |
| 45 | 23 | PIP-1 | 9-anthracenemethanol | 67 |

A similar trend in soot handling performance as compared to antiwear performance can be seen from the results in Table 5. As the number of contiguous aromatic groups is increased from 1 to 4, the % viscosity increase as a result of soot is decreased (Examples 36-40). Examples 41 and 42 illustrating the linker group influence gave higher than expected % viscosity increase, though still much improved over the baseline. Finally, Examples 43-45 illustrate that different olefin copolymers of varying composition, MA level, and Mn are effective in this invention.

In one embodiment, the hydroxyl-linked polycyclic hydrocarbon compound has the linker group selected from the group consisting of a hydroxyl-alk-(oxy-alk)$_n$-oxy and hydroxyl-alk-(oxy-alk)$_n$thio- wherein alk in each instance is independently alkylene selected from 2 to 6 carbon atoms and n is an integer from 5 to 25.

In one embodiment, there is provided an additive concentrate comprising an inert liquid organic diluent and from about 3 to 50 percent by weight of the oil soluble lubricating oil additive disclosed herein.

In one embodiment, the inert liquid organic diluent is a diluent oil selected from a Group II, Group III, Group IV or Group V base oil or a mixture thereof, or a mixture of a Group I base oil and at least one Group II, Group III or Group IV base oil.

What is claimed is:

1. An oil-soluble lubricating oil additive composition prepared by the process which comprises reacting:
    (a) a hydrocarbon polymer having a number average molecular weight ($M_n$) between about 7,000 and about 500,000;
    (b) an ethylenically unsaturated acylating agent; and
    (c) a hydroxyl-linked polycyclic hydrocarbon compound having 3 to 6 contiguous fused carbocyclic rings wherein the carbocyclic ring is independently selected from 5 to 7 carbon atoms and the polycyclic hydrocarbon compound contains at least 5π bonds;
    wherein the hydrocarbon polymer has been functionalized with a maleic anhydride acylating agent in the range of 0.5 to 3.0 wt % of maleic anhydride based upon the total mass of polymer.

2. The oil-soluble lubricating oil additive of claim 1, wherein the hydrocarbon polymer is a homopolymer or copolymer selected from the group consisting of: (1) polymers of aliphatic olefins having from 2 to about 28 carbon atoms; (2) polymers of dienes; (3) copolymers of conjugated dienes with vinyl substituted aromatic compounds; and (4) star polymers.

3. The oil-soluble lubricating oil additive of claim 2, wherein the copolymer selected from (1) polymers of aliphatic olefins having from 2 to about 28 carbon atoms wherein one olefin is ethylene.

4. The oil-soluble lubricating oil additive of claim 3, wherein the ethylene content of the copolymer is from 45-52 wt % ethylene.

5. The oil-soluble lubricating oil additive of claim 4, wherein the copolymer is an ethylene-propylene copolymer having a number average molecular weight from 7,000 to about 60,000.

6. The oil-soluble lubricating oil additive of claim 1, wherein the hydrocarbon polymer is an optionally hydrogenated polymer of dienes, wherein the diene is a conjugated diene selected from the group consisting of isoprene, butadiene, and piperylene.

7. The oil-soluble lubricating oil additive of claim 2, wherein the hydrocarbon polymer is an optionally hydrogenated copolymer of a conjugated diene with vinyl substituted aromatic compound wherein the vinyl substituted aromatic compound is a styrenic monomer.

8. The oil-soluble lubricating oil additive of claim 7, wherein the diene is selected from the group consisting of isoprene and 1,3-butadiene.

9. The oil-soluble lubricating oil additive of claim 2, wherein the hydrocarbon polymer is a star polymer wherein the arms are derived from dienes and vinyl substituted aromatic compounds.

10. The oil-soluble lubricating oil additive of claim 1, wherein the ethylenically unsaturated acylating agent comprises at least one member of the group consisting of acrylic acid, crotonic acid, methyacrylic acid, maleic acid, maleic anhydride, fumaric acid, itaconic acid and itaconic anhydride, citraconic acid, citraconic anhydride, mesaconic acid, glutaconic acid, chloromaleic acid, aconitic acid, methylcrotonic acid, sorbic acid, and ester of the acids, and combinations of the foregoing.

11. The oil-soluble lubricating oil additive of claim 1, wherein grafting of the hydrocarbon copolymer is conducted at about 100° C. to about 250° C. in the presence of a free radical initiator.

12. The oil-soluble lubricating oil additive of claim 1, wherein the ethylenically unsaturated acylating agent is first reacted with the hydroxyl-linked polycyclic hydrocarbon compound to form a reaction product wherein the reaction product is grafted to the polymer backbone.

13. The oil-soluble lubricating oil additive of claim 1, wherein the hydroxyl-linked polycyclic hydrocarbon compound has the linker group selected from the group consisting of a hydroxy-alkylene group from 1 to 10 carbon atoms, hydroxyl-alky-oxy-, hydroxyl-alk-(oxy-alk)$_n$-oxy and hydroxyl-alk-(oxy-alk)$_n$-thio- wherein alk in each instance is independently alkylene selected from 2 to 6 carbon atoms and n is an integer from 1 to 100.

14. The oil-soluble lubricating oil additive of claim 13, wherein the hydroxyl-linked polycyclic hydrocarbon compound has the linker group selected from the group consisting of a hydroxy-alkylene group from 1 to 10 carbon atoms.

15. The oil-soluble lubricating oil additive of claim 13, wherein the hydroxyl-linked polycyclic hydrocarbon compound has the linker group selected from the group consisting of a hydroxyl-alky-oxy wherein alk is alkylene selected from 2 to 6 carbon atoms.

16. The oil-soluble lubricating oil additive of claim 13, wherein the hydroxyl-linked polycyclic hydrocarbon compound has the linker group selected from the group consisting of a hydroxyl-alk-(oxy-alk)$_n$-oxy and hydroxyl-alk-(oxy-alk)$_n$-thio- wherein alk in each instance is independently alkylene selected from 2 to 6 carbon atoms and n is an integer from 1 to 100.

17. The oil-soluble lubricating oil additive of claim 16 wherein n is an integer from 5 to 25.

18. The oil-soluble lubricating oil additive of claim 1, further comprising reacting a second selected alcohol from the group consisting of aliphatic alcohols, cycloaliphatic alcohols, and monohydroxy polyethers.

19. The oil-soluble lubricating oil additive of claim 1, wherein the process which comprises reacting is conducted in an extruder.

20. An additive concentrate comprising an inert liquid organic diluent and from about 3 to 50 percent by weight of the oil soluble lubricating oil additive of claim 1.

21. The additive concentrate of claim 20, wherein the inert liquid organic diluent is a diluent oil selected from a Group II, Group III, Group IV or Group V base oil or a mixture thereof, or a mixture of a Group I base oil and at least one Group II, Group III or Group IV base oil.

22. A lubricating oil composition comprising a major amount of an oil of lubricating viscosity and a minor amount of the oil soluble lubricating oil additive of claim 1.

23. The lubricating oil composition of claim 22, further comprising at least one additive selected from the group consisting of antioxidants, antiwear agents, detergents, dispersants, friction modifiers, corrosion and rust inhibitors, viscosity index improvers and anti-foam agents.

24. The lubricating oil composition of claim 23, wherein the at least one additives are selected for use as a heavy duty diesel engine lubricating oil composition.

* * * * *